July 28, 1953        P. A. LETIEN        2,646,701
STEPPED EDGE CUTTING TOOL
Filed Dec. 27, 1949
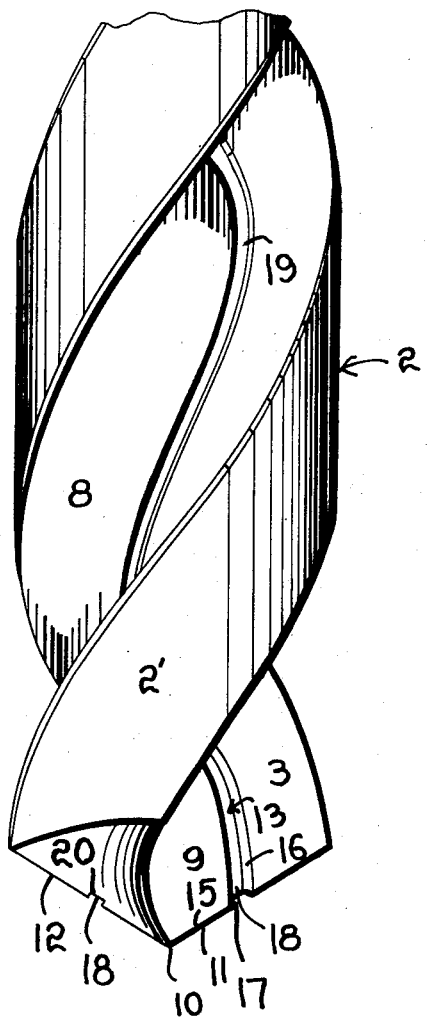
Fig. 1
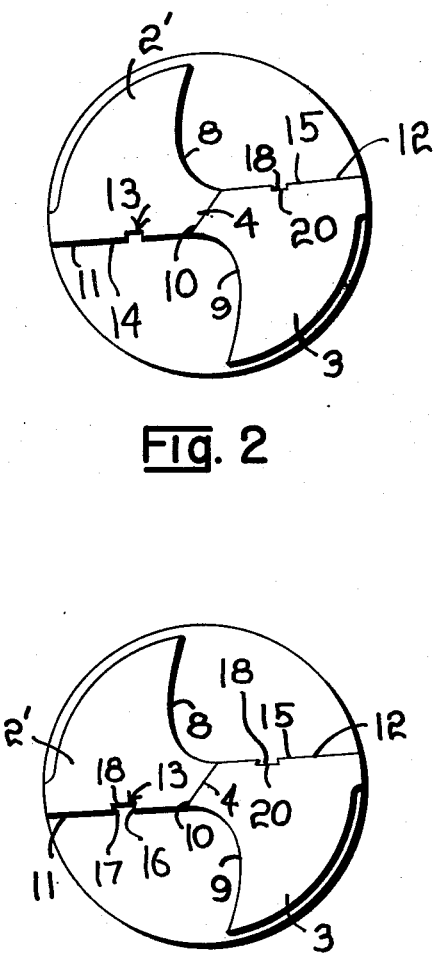
Fig. 2
Fig. 3
PETER A. LETIEN
*INVENTOR.*
BY Lester B. Clark
    Ray L. Smith
*ATTORNEYS*

Patented July 28, 1953

2,646,701

UNITED STATES PATENT OFFICE 2,646,701

STEPPED EDGE CUTTING TOOL

Peter A. Letien, Houston, Tex.

Application December 27, 1949, Serial No. 135,218

1 Claim. (Cl. 77—70)

The invention relates to a cutting tool and in particular to a cutting tool which is provided with a groove which forms additional cutting surfaces to contact a work piece against which the tool is operated.

An object of the present invention is to provide a drill which has spiral blades extending longitudinally of a drill shank with cutting lips on the outer edges of said blades, said blades having grooves longitudinally thereof in their leading faces which intersect said cutting lips and with the inner face of such grooves being parallel to the cutting lip at the point of intersection.

An object of the present invention is to provide a drill which has spiral blades extending longitudinally of a drill shank with cutting lips on the outer edges of said blades, said blades having grooves longitudinally thereof in their leading faces which intersect said cutting lips and with the inner face of such grooves being parallel to the cutting lip at the point of intersection to form a second cutting edge to contact a work piece.

Another object of the invention is to provide a drill including a shank, spiral cutting blades extending longitudinally thereof, a central web connecting the inner edges of said blades, a chisel point at the outer end of said web, and cutting lips on the outer edges of said blades, said spiral blades twisted longitudinally to form flutes, and said blades having grooves longitudinally thereof in their leading faces which are rectangular in cross sections and intersecting said cutting lips.

Another object of the invention is to provide a drill including a shank, spiral cutting blades extending longitudinally thereof, a central web connecting the inner edges of said blades, a chisel point at the outer end of said web, and cutting lips on the outer edges of said blades, said spiral blades twisted longitudinally to form flutes, and said blades having grooves longitudinally thereof in their leading faces which are rectangular in cross sections and intersecting said cutting lips, with the inner face of such grooves being parallel to the cutting lips at the point of intersection.

Still another object of the invention is to provide in a cutting tool a cutting lip which is adapted to be advanced perpendicular to a work piece to make cuts therein and a groove intersecting said lip with such groove having an inner face parallel to the cutting edge at the point of intersection to form a second cutting lip which contacts the work piece.

Still another object of the invention is to provide in a cutting tool a groove which forms an auxiliary or second cutting edge and which provides a means of lubrication to the point of the drill in contact with a work piece.

Other objects and advantages of the invention will become more readily apparent from a consideration of the following description and drawings wherein:

Fig. 1 is a vertical elevation of the invention showing it illustrated on a drill;

Fig. 2 is a bottom plan view of the drill shown in Fig. 1;

Fig. 3 is a modification of the invention as illustrated in Figs. 1 and 2.

In Fig. 1 the invention as illustrated on a drill designated generally by the numeral 2. The drill illustrated in the drawings is of the ordinary twist form and comprises the portions 2' and 3 which form the spiral cutting blades. A central web 4 connects the inner edges of the blades 2' and 3. The spiral form of the blades 2' and 3 forms the flutes 8 and 9 therebetween.

The lower end 10 of the central cutting web forms the chisel cutting point of the drill. The outer ends of the blades 2' and 3 form the cutting lips 11 and 12 for the drill.

Particular attention is directed to the groove construction 13 arranged on the leading face 14 and 15 of each of the cutting blades. This groove comprises the side walls 16 and 17 joined by the inner face 18. The groove extends longitudinally of the blades as illustrated at 19 in Fig. 1 of the drawing.

The groove 13 intersects the cutting lips 11 and 12 of the blades 2' and 3. It is to be noted that the inner face 18 of such groove is parallel to the cutting lip at the point of intersection of such groove and cutting lip.

This construction forms a stepped cutting edge or a second cutting edge which is parallel to the cutting lips 11 and 12. This cutting edge is designated at 20 in Fig. 1 and is the edge formed by the intersection of the face 18 of the groove 13 with each of the cutting lips 11 and 12. This particular arrangement of cutting edge causes the shavings to be cut and leaves the material and tool in such a fashion as to permit the cutting oil to remain around the cutting edge of the tool. This eliminates or tends to decrease the heat in the end of the tool caused by frictional contact of the tool with the work piece. The groove also by stepping the bite, or by effecting a stepped cutting action, allows less pressure to be exerted on the material or tool as it is advanced into the material to make a cut.

The cutting lips 11 and 12 with the aid of the stepped cutting edge 20 prevents chattering of the drill as it passes through the ending side of the work piece. The action of the stepped cutting edge 20 may be explained by stating that such edge forms a second cutting lip parallel to, but smaller in length than the cutting lips 11 and 12. The second cutting lip or edge 20 has the same effect as if another drill were positioned longitudinally of the drill 2 and acting therewith against the work piece. It has also been found that the groove does not necessarily break the shavings up but allows them to come out in one piece thus eliminating the tendency for the tool to jam in the work piece.

A modified form of the invention is illustrated in Fig. 3 wherein the groove 13 is shown as having the inner face 18 with the side wall surfaces 16 and 17. It is to be noted that the side wall surfaces of such modified construction are slightly inclined toward the inner face 18 to form a groove having a dovetail cross section thus providing clearance between the inclined side walls 16 and 17 and the portion of the material cut by the cutting edge 20 during the drilling operation. The clearance along the inclined side walls 16 and 17 of the dovetail groove provides passages for the free circulation of cutting oil to the cutting lips 11 and 12 and cutting edges 20. Further, this arrangement eliminates the frictional contact between the side walls 16 and 17 and the portion of the material left during drilling at the intersection of the groove with the cutting lips 11 and 12. This form of construction may be found desirable when operating upon certain types of work pieces.

It has been found in actual operation of this tool that production can be speeded up as much as 50% in some cases. The stepped cutting edges 20 exert an additional cutting effort against the work piece to supplement the cutting action of the lips 11 and 12.

It seems obvious of course, that the size of the groove will be varied depending upon several circumstances. For example, the diameter of the boring tool may vary depending upon the size of hole or opening desired. The material being drilled may be harder or softer thus necessitating a change in the groove 13. Also more than one groove per leading face may be used if desired.

It is desirable that the cutting tool have the same size and shape groove on each leading face 14 and 15. This eliminates wobbling of the cutting tool and helps to keep it aligned as it is advanced against the work piece.

While the invention is being described and is shown in the drawings as being applied particularly to twist drills, it seems obvious that any cutting tool such as a milling tool and the like which is advanced perpendicular against a work piece to make a cut therein may be provided with the groove construction shown in the drawing whereby a second cutting edge parallel to a primary cutting edge is presented to complement and supplement the cutting action of such primary cutting edge.

Broadly the invention contemplates providing a cutting tool with a stepped cutting edge so that the bite that such cutting tool takes in a work piece may be stepped and supplemented by such stepped cutting edge.

What is claimed is:

A drill comprising spiral cutting blades forming spiral flutes extending longitudinally thereof, a central web connecting the inner edges of said blades, a chisel point at the outer end of said web, cutting lips on the outer ends of said blades, said blades having grooves longitudinally thereof in their leading faces, each of said grooves intersecting one of said cutting lips and having at the point of intersection a straight inner cutting edge parallel thereto, and each of said grooves having side wall surfaces inclined inwardly toward said inner cutting edge to form a dovetail groove whereby during drilling passages are formed between the cutting lips and the inner cutting edges of the grooves to permit circulation of cutting oil to the surface of the material being cut to form a dovetail groove.

PETER A. LETIEN.

References Cited in the file of this patent

UNITED STATES PATENTS

| Number | Name | Date |
| --- | --- | --- |
| 599,537 | Steudner | Feb. 22, 1898 |
| 867,639 | Bragg | Oct. 8, 1907 |

FOREIGN PATENTS

| Number | Country | Date |
| --- | --- | --- |
| 452,750 | Great Britain | Aug. 28, 1936 |